United States Patent [19]

Fukushima

[11] 4,337,394
[45] Jun. 29, 1982

[54] MARK MEANS FOR ADJUSTING THE POSITION OF SOLID-STATE LINE IMAGE SENSOR

[75] Inventor: Yoshio Fukushima, Machida, Japan

[73] Assignee: Ricoh Co., Ltd., Japan

[21] Appl. No.: 166,960

[22] Filed: Jul. 8, 1980

[30] Foreign Application Priority Data

Jul. 11, 1979 [JP] Japan ................................ 54-86837

[51] Int. Cl.³ .............................................. H01J 3/14
[52] U.S. Cl. ................................ 250/237 G; 250/578; 356/401
[58] Field of Search .................. 250/216, 561, 237 R, 250/237 G; 356/399, 400, 401; 358/264

[56] References Cited

U.S. PATENT DOCUMENTS 4,193,687 3/1980 Reekstin et al. ................ 250/237 G
4,278,893 7/1981 Kato et al. .......................... 356/401

Primary Examiner—David C. Nelms
Attorney, Agent, or Firm—McGlew and Tuttle

[57] ABSTRACT

A mark placed on the original support plate outside the original support zone for adjusting the position of a solid-state line image sensor of a line-by-line image dissecting system including a first mark member extending in a direction perpendicular to the auxiliary scanning direction of an original, and a second mark member parallel to the first mark member and spaced apart therefrom by a spacing interval substantially equal to the width of an array of light receiving elements of the solid-state line image sensor when projected on the surface of the sensor as an image of a reduced scale. The first mark member includes a solid straight line or a broken straight line, and the second mark member includes one or a plurality of broken straight lines parallel to one another. Dashes constituting each broken straight line are spaced apart from one another by a spacing interval which differs from one broken straight line to another, to enable different broken straight lines to be distinguished from one another. The mark further includes a plurality of bars or bar elements extending to be projected on the surface of the sensor as bar images or bar element images between the limits of the initial setting tolerance of the solid-state line image sensor.

8 Claims, 18 Drawing Figures

FIG. 7
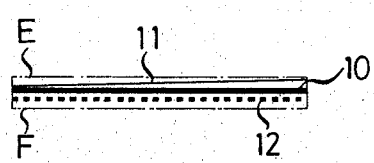
FIG. 8
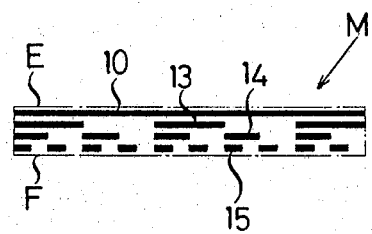
FIG. 9
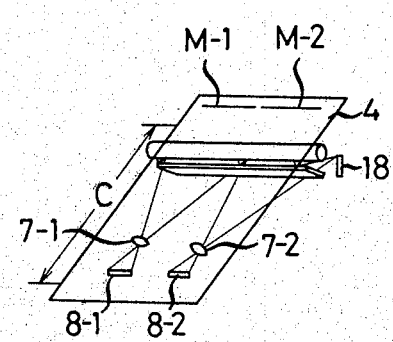
FIG. 10
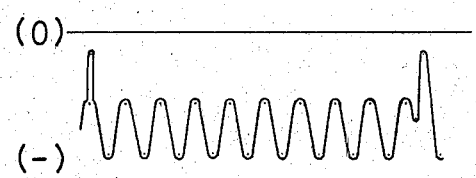
FIG. 11
FIG. 12
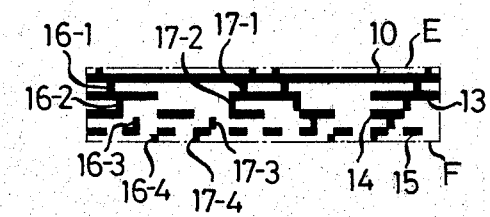

(a)          (b)

MARK MEANS FOR ADJUSTING THE POSITION OF SOLID-STATE LINE IMAGE SENSOR

BACKGROUND OF THE INVENTION (b 1) Field of the Invention

This invention relates in general to line-by-line dissection systems of the image of a document or photograph using a solid-state line image sensor, and more particularly it is concerned with mark means placed on the original support plate in a position outside the original supporting zone as a guide for obtaining accurate positioning of an array of light receiving elements of the solid-state line image sensor in a direction perpendicular to the auxiliary scanning direction of the original.

The system described are now widely in use with facsimile transmitters, copying apparatus using a built-in microcomputers, etc. Generally, a line-by-line dissection system comprises irradiating means for irradiating an original, such as document or photograph, with a strip of light of large legth and small width, and a solid-state line image sensor. In this type of system, either the light emanating from the irradiating means or the original is moved relative to the other, to effect auxiliary scanning of the original. In this specification, the auxiliary scanning refers to a scanning effected lengthwise of the original support plate. Another type of line-by-line dissection system comprises irradiating means for irradiating the entire surface of the original, a mirror unit for taking out a portion of the light reflected by the irradiated original as a strip of light, and a solid-state line image sensor. The mirror unit is moved relative to the original to obtain an auxiliary scanning of the original. In both types of system, the light reflected by the original as the auxiliary scanning is carried out is led through a lens to the solid-state line image sensor of the self-scanned type. More specifically, a fragmentary image of the irradiated original or one-line image of the original corresponding to the width of the light receiving elements of the sensor forming an array is transmitted through the lens and formed on the surface of the solid-state line image sensor as an image of a reduced scale. The one-line image of the reduced scale is moved relative to the surface of the solid-state line image sensor in a direction perpendicular to the direction of the longitudinal axis of the line image.

(2) Description of the Prior Art

A line-by-line dissection system used as with a facsimile transmitter is constructed as shown in FIG. 1, for example. A first scanning member 3 comprising a light source 1 and a mirror 2 irradiates an original 5 placed on an original support plate 4 with a strip of light having a larger longitudinal axis than a transverse axis and moves in the direction of an arrow A (auxiliary scanning) while a portion of the light reflected by the original is projected toward a second scanning member 6. The second scanning member 6 which has the reflected light incident thereon reflects the incident light toward an image forming lens 7, while moving in the direction of an arrow B at a velocity which is one half that of the first scanning member 3. The image forming lens 7 on which is incident the light reflected by the original as the first and second scanning members 3 and 6 move causes a portion of the original to be formed as an image of a reduced scale on the light receiving surface of a solid-state line image sensor 8 of the self-scanned type which may comprise a charge coupled device. The solid-state line image sensor 8 comprises a multiplicity of light receiving elements of small area corresponding to picture elements which are arranged in an array for effecting image dissection and conversion of an optical signal into an electrical signal with respect to a straight line portion of the original incident on the light receiving surface of the solid-state line image sensor 8. The electrical signal obtained by the light receiving elements by conversion from the light signal is taken out in chronological sequence as voltage signals each corresponding to one of the light receiving elements. This process of taking out the voltage signals in chronological sequence is referred to as a main scanning. The voltage signals taken out in chronological sequence are coded and forwarded to electronic equipment built in a blotter where the coded signals are restored to their original form to be arrived to the blotter. In the blotter, there are also main scanning and auxiliary scanning directions and the main scanning direction of the blotter is usually perpendicular to the auxiliary scanning direction thereof. This makes it necessary to cause the main scanning direction to be disposed perpendicular to the auxiliary scanning direction in the solid-state line image sensor. If the angle of intersection of the main scanning direction and the auxiliary scanning direction in the blotter is at variance with the corresponding angle in the solid-state line image sensor, the reproduced image of the original would be distorted or inclined.

To enable the direction of the array of the light receiving elements of the solid-state line image sensor or the main scanning direction to be correctly disposed perpendicular to the auxiliary scanning direction, it has hitherto been customary to place, as shown in FIG. 2, a straight line mark 9 or a straight line mark 9' on the original support plate outside an original support zone C in such a manner that the mark 9 extends in a direction perpendicular to the auxiliary scanning direction. An image of the straight line mark 9 would be formed in the vicinity of the solid line image sensor 8 and aid in adjusting the position and inclination of the solid-state line image sensor 8 by bringing the array of light receiving elements into agreement with the image of the straight line mark 9. Whther or not this agreement is obtained could be determined by using an oscilloscope for indicating the voltage signals arranged in chronological sequence, which is referred is as a time-sequential signal.

FIG. 3 shows an example of the positional relation between image 10 of a reduced scale of the straight line mark 9 and the light receiving element array 11 of the solid-state line image sensor 8, obtained when the solid-state line image sensor is tested following its initial setting as a component of the system. It will be noted that in this example the light receiving element array 11 is inclined counterclockwise with respect to the mark image 10 and that the intersection of the two is disposed rightwardly of the center of the light receiving element array 11. In this condition, the output of the solid-state line image sensor 8 is as shown in a broken line in FIG. 4. The output of the solid-state line image sensor 8 will hereinafter be shown in the form of a solid line to facilitate observation of discrete portions of the output signal. Since the width of the image 10 of the reduced scale of the straight line mark 9 is set to be substantially equal to that of the light receiving element array 11, the output of the solid-state line image sensor 8 would become substantially zero when the mark image 10 and the light receiving element array 11 coincide with each other, and the output would be increased in value depending on the degree of coincidence. In FIG. 4, a straight line D represents the output of the solid-state line image sensor 8 obtained when the position of the latter has been adjusted to be in perfect parallel relation to the mark 9. In this figure, the condition of the absence of information (white level) is indicated as being negative and the condition of the presence of information (block level) is indicated as being positive, with the positive output condition being shown in the upper portion of the figure. However, observations of the output condition of the solid-state line image sensor 8 shown in FIG. 4 would provide a basis for judging the position in which the light receiving element array 11 is substantially coincident with the reduced image 10 but could not provide information as to the direction of inclination of the sensor 8 with respect to the mark 9.

Thus, in spite of the expectation that the solid-state line image sensor would be greatly inclined, when the solid-state line image sensor is moved in a direction deemed appropriate in adjusting its position and inclination, the probability that the selected direction is a correct direction would be only 50%. This would make it necessary to carry out an adjusting operation by trial and error until the output becomes uniform in the entire range as indicated by the straight line D. Such operation would increase the time required for mounting the solid-state line image sensors in the production line, thereby reducing production efficiency.

In the prior art, the straight line mark 9 is only one in number. As a result, when a solid-state line image sensor is not parallel to the mark or not correctly positioned with respect to the auxiliary scanning line, when it is initially mounted on the system, the light receiving element array of the sensor will not cross the straight line mark image at all and consequently no output will be produced. In this condition of absence of an output, it would be impossible to determined in which direction the solid-state line image sensor should be moved to bring the light receiving element array into agreement with the straight line mark image.

The position in which the solid-state line image sensor is finally mounted correctly only covers the zone of a straight line mark (actually it is much smaller because it is reduced in scale) and its width corresponds to that of the mark. Thus difficulties would be encountered in effecting adjustments to bring the light receiving element array into alignment with the straight line mark, thereby prolonging the time required for carrying out adjustments.

SUMMARY OF THE INVENTION

An object of this invention is to provide mark means suitable for use in correcting the position and inclination of a solid-state line image sensor of a line-by-line image dissection system which, obviating the aforesaid disadvantages of the prior art, enables the direction in which the solid-state line image sensor is inclined to be detected by merely watching the condition of the output of the solid-state line image sensor as the latter is initialy mounted in the system.

A second object is to provide mark means of the type described which enables the solid-state line image sensor to produce an output even if the position of the sensor deviates from the correct position when initially mounted in the system, thereby permitting the judgement to be readily made with regard to the direction in which the sensor may be moved to set same in the correct position.

A third object is to provide mark means of the type described wherein the zone in which the solid-state line image sensor is set is expanded to an initial setting tolerance limits so that no matter in what position the sensor is set within the tolerance limits one has only to correct the inclination of the sensor or the light receiving element array in that position to obtain the palallelism of the sensor.

BRIEF DESCRIPTION OF THE DRAWINGS

FIG. 7 is a view showing the light receiving element array of the solid-state line image sensor being disposed such that it is not in parallel with the image of the mark means according to the invention shown in FIG. 5 and it does not intersect same;

FIG. 8 shows another embodiment of the mark means in conformity with the invention wherein the second mark consists of a plurality of broken straight line parallel to one another;

FIG. 9 shows still another embodiment of the mark means in conformity with the invention comprising a first mark consisting of a solid straight line, a second mark consisting of a plurality of broken straight lines parallel to one another, and a plurality of bars extending perpendicular to the first and second marks and each disposed on either end of the mark means as seen in the main scanning direction to indicate the initially setting tolerance limits in the auxiliary scanning direction;

FIG. 10 is a view showing the condition of the output of the solid-state line image sensor obtained when the center line of the light receiving element array of the image sensor is disposed at the boundary between the lowermost broken straight line image of the mark means shown in FIG. 9 and the interval adjacent same;

FIG. 11 is a view showing an image dissection system of the split image type comprising two solid-state line image sensors arranged in side-by-side relation in the main scanning direction, on which are formed images each representing one half the light reflected by the original irradiated by the light of a straight line form;

FIG. 12 is a view showing still another embodiment of the mark means in conformity with the invention wherein the plurality of bars of the embodiment shown in FIG. 9 each consists of a plurality of bar elements disposed between all the lines of the mark to distinguish them from one another;

DESCRIPTION OF THE PREFERRED EMBODIMENTS

Figure 1:
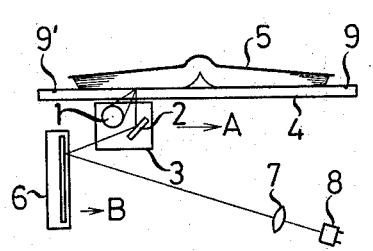
FIG. 1 is a schematic showing of one example of line-by-line dissection system of the prior art using a solid-state line image sensor, wherein a mark for correcting the parallelism of the solid-state line image sensor is placed on the original support glass plate in a position outside the original support zone.
Figure 2:
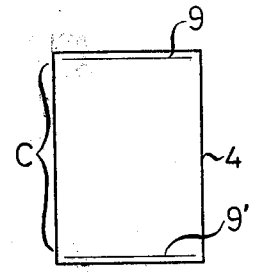
FIG. 2 is a plan view of the original support glass plate shown in FIG. 1, showing a straight line mark consisting of one straight line of the prior art placed on the glass plate.
Figure 3:
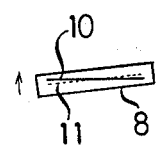
FIG. 3 is a view showing the solid line image sensor being inclined with respect to the image of a reduced scale of the straight line mark and the light receiving element array of the sensor intersecting the image of the straight line mark.
Figure 4:
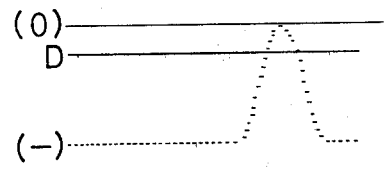
FIG. 4 is a view showing the output condition of the solid-state line image sensor obtained when the sensor is positioned relative to the straight line mark as shown in FIG. 3, the white level of picture information being shown as a negative and the black level thereof being shown at a higher level.
Figure 5:
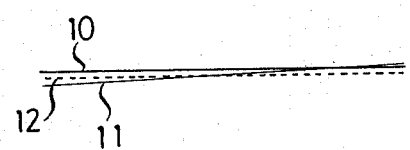
FIG. 5 shows the mark means comprising one embodiment of the invention comprising a first mark consisting of a solid straight line and a second mark consisting of a broken straight line disposed adjacent the first mark being projected as images of a reduced scale on the surface of the solid-state line image sensor, the mark images being intersected by the light receiving element array of the sensor.
Figure 6:
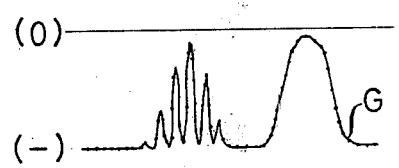
FIG. 6 is a view similar to FIG. 4 but showing the condition of the output of the solid-state line image sensor obtained when the sensor is positioned relative to the image of the mark means according to the invention as shown in FIG. 5.

A first embodiment will be described by referring to FIGS. 5 and 6. The mark means according to one embodiment designated by the reference symbols M comprises a first mark consisting of a solid straight line, and a second mark consisting of a broken straight line with the dashes (sign elements) of the broken line being spaced apart from one another by a predetermined spacing interval (blank element) and disposed parallel to the first mark. The two marks have the same width and are spaced apart from each other by a spacing interval equal to the width of the two mark. FIG. 5 shows images 10 and 12 of the solid straight line and the broken straight line respectively as formed on the surface of the sensor 8 on a reduced scale. Assume that the solid-state line image sensor 8 is mounted in an inclined position and a light receiving element array 11 of the sensor 8 is inclined as shown in FIG. 5 with respect to the image of the mark means M. In this case, the output of the solid-state line image sensor 8 is as represented by a curve G in FIG. 6. More specifically, an elevated portion on the right side of the curve G shown in FIG. 6 represents an output portion of the solid-state line image sensor 8 produced by the straight solid line image 10 intersecting the light receiving element array 11. This output portion is similar to the output shown in FIG. 4. The output portion of the sensor 8 produced by the broken straight line image 12 intersecting the light receiving element array 11 is represented by a series of elevated portions shown on the left side of the curve G which are arranged in a repeat pattern corresponding to the interval spacing between the dashes of the broken straight line. Thus if the intersection of the solid line image 10 and the light receiving element array 11 is disposed rightwardly of the intersection of the broken line image 12 and the light receiving element array 11 as shown in FIG. 5, the single elevated portion in wave form will appear rightwardly of the series of elevated portions in repetitive wave form as shown in FIG. 6. This clearly indicates that the solid-state line image sensor 8 is inclined counterclockwise with respect to the mark means M.

If the single elevated portion in wave form appears leftwardly of the series of elevated portions of the repetive wave form, it will be apparent that the solid-state line image sensor 8 is inclined clockwise with respect to the mark means M. This gives a clear idea as to the direction in which the solid-state line image sensor 8 should be moved to correct its position and inclination.

In many applications, the quality of the image required in facsimile transmission, for example is such that the line density should be 8/mm–12/mm both in the main scanning and auxiliary scanning directions. Assume that the line density of 8/mm is used. In this case, a solid straight line of the mark means M will have a width which is substantially equal to the minimum width 125 $\mu$m of the picture image required. If the mark means M is reduced in size to $\frac{1}{8}$ of the original when its image is formed on the surface of the solid-state line image sensor 8, the light receiving element array 11 will have a width of about 15 $\mu$m. Meanwhile, in the initial setting position, the solid-state line image sensor 8 should have a tolerance of 100–500 $\mu$m which may vary depending on the possible error made in producing same.

Assume that the solid-state line image sensor 8 is produced with a high degree of precision and has, in its initial setting position, a tolerance of 100 $\mu$m. In this case, 100/15 ≈ 7 and there is a possibility that a displacement corresponding to the width of about seven lines will occur. Even if the mark means M comprising two marks or a solid straight line presenting the image 10 and a broken straight line presenting the image 12 on the surface of the solid-state line image sensor 8 as shown in FIG. 5 is used, it may happen that the light receiving element arrary 11 is disposed outwardly of the solid line image 10 as shown in FIG. 7 and as a result no output will be produced by the solid-state line image sensor 8. If this is the case, it would be impossible to determine the initial setting position of the sensor 8. The mark means comprising a first mark consisting of a solid straight line presenting the image 10 on the sensor 8 and a second mark consisting of a broken straight line presenting the image 12 on the sensor 8 constitutes the basic form of the mark means according to the invention. In FIG. 7, dash-and-dot lines E and F define the limits of tolerance of initial setting of the sensor 8.

A second embodiment will be described by referring to FIG. 8 wherein the mark means M comprises a first mark consisting of a solid straight line and a second mark consisting of a plurality of broken straight lines arranged such that when the mark means is projected on the surface of the solid-state line image sensor on a reduced scale all the lines of the mark means lie within the limits of tolerance of the initial setting of the sensor 8. The plurality of broken straight lines are parallel to the solid straight line and have a width which is equal to that of the light receiving element array 11 when the former are viewed on a reduced scale. The plurality of broken straight lines are spaced apart from one another by a spacing interval which is equal to the width of the light receiving element array 11 when the former are viewed on a reduced scale. Each broken straight line comprises dashes or sign elements and spacing intervals or blank elements. The sign elements and blank elements have their length reduced as the broken straight lines are further removed from the solid straight line. The broken straight lines are shown at 13, 14 and 15 in FIG. 8 as images formed on a reduced scale on the surface of the solid-state line image sensor 8, and the solid straight line is also shown as the image 10 in the same figure. The width of the spacing (outer spacing) between one limit line E of initial setting tolerance and the solid line image 10 and the width of the spacing (outer spacing) between the outer limit line F of initial setting tolerance and the broken line image 15 of the mark means M are made smaller than the width of the light receiving element array 11.

The use of the mark means M of the aforesaid constructional form results in the light receiving element array 11 positively intersecting any one of the broken line images 10, 13, 14 and 15 when the solid-state line image sensor 8 is inclined. When the angle of inclination is very small and the light receiving element array 11 intersects only one of the straight line images 10, 13, 14 and 15 at one point alone (although the probability of such condition occurring is very small), it is impossible to detect the direction of inclination. However, if the line images intersect one another at more than two points, it will be possible to readily determine the direction of inclination of the solid-state line image sensor 8 by checking its output.

When the light receiving element array 11 is disposed in a space between the solid straight line image 10 and the broken straight line image 13 or between the broken straight lines 13, 14 and 15, the solid-state line image sensor 8 produces no output at all, thereby making it impossible to judge the position of the sensor 8 based on the wave form of its output. However, since the plurality of line images are spaced apart from one another by a distance corresponding to the width of the light receiving element array 11 within the initial setting tolerance limits, no output produced by the sensor 8 indicates that the sensor 8 is positioned correctly with regard to its parallelism with the mark means M. No more operation for adjusting the parallelism is necessary.

When one detects that the solid-state line image sensor 8 produces no output by using the mark M shown in FIG. 8, the situation may be attributed to different causes. It may mean that the output is at the white level. However, when the solid-state line image sensor 8 is set incorrectly and deviates from its initial setting tolerance limits, no output would be produced. To distinguish between the two conditions, a second embodiment provides a plurality of bars each disposed near one end of the straight lines and extending perpendicular thereto to be disposed in all the spacing intervals between the straight lines and the outer spacing at the both side of the first and second marks. More specifically, such bars are shown in FIG. 9 at 16 and 17 as bar images projected on a reduced scale on the surface of the solid-state line image sensor 8. The bar images 16 and 17 are perpendicular to the solid-state line image 10 and have a length corresponding to the initial setting tolerance of the sensor 8. The output of the sensor 8 produced by the presence of the bar images 16 and 17 makes it possible to distinguish between the light receiving element array 11 which is within the initial setting tolerance limits and the light receiving element array 11 which is outside the initial setting tolerance limits. That is, in the former, the output of the sensor 8 has two elevated portions each disposed at one of opposite ends of the wave form, and in the latter no output is produced at all.

When the parallelism of the sensor 8 with the mark M is correctly adjusted by using the mark means M shown as a reduced image in FIG. 9 such that one half of the light receiving element array 11 lies on the broken line image 15 and the other half thereof lies in the spacing interval between the broken line image 15 and the adjacent line image, the output of the sensor 8 has a wave form shown in FIG. 10.

The bars disposed perpendicular to the straight lines of the mark means M to extend across the spacing intervals between the lines need not be straight as indicated by the bar images 16 and 17 in FIG. 9. If the distance between the two bars disposed in the spacing intervals is varied depending on the position of the spacing interval to which the bars belong, it will be possible to determine the particular spacing interval in which the light receiving element array lies.

When the straight line mark 9 of the prior art is used, the solid line-state image sensor 8 adjusted to the mark 9 would only deviate from the mark 9 by a distance corresponding to twice the width of the light receiving element array 11. Thus positioning of the sensor 8 to the mark 9 could be achieved with a high degree of accuracy. However, the trouble is that the operation using the mark 9 for setting the sensor 8 would be time consuming. It is significant that basically the sensor 8 has only to be disposed parallel to the mark 9 and the amount of deviation of the former from the latter is of no importance so long as they are parallel to each other. This is because it is possible to obtain correct synchronization of read-out by detecting or calculating by separate means the entrance of the scanning position in the original supporting zone at the time the auxiliary scanning for read-out of the original is carried out, and it is not necessary to set an initial position for the auxiliary scanning direction.

Thus when the second mark of the mark means M consists of a plurality of broken straight lines as shown in FIGS. 8 and 9, adjustments of the position of the solid-state line image sensor 8 are considered to be completed if the inclination of the sensor 8 with respect to the mark means M is corrected, even if the light receiving element array 11 overlies only the solid straight line image 10, any one of the broken straight line images 13, 14 and 15 or the bar images 16 and 17 indicating the initial setting tolerance limits.

The present invention can have application in a line-by-line image dissection system of the split image read-out type known in the art which uses a plurality of solid-state line image sensors 8 arranged in side-by-side relation in the main scanning direction, and a plurality of image forming lenses corresponding to the sensors 8, to obtain continuous picture information by connecting in series time-sequential signals produced by the solid-state line image sensors 8. Application of the invention to this type of system will now be described.

FIG. 11 shows a solid line image scanning device of the line-by-line image dissection system of the split image read-out type comprising an original support plate 4, a scanning member 18 including a light source and a plurality of mirrors, a plurality of image forming lenses 7-1 and 7-2 and a plurality of solid-state line image sensors 8-1 and 8-2. In this system, the original is divided into two portions in the main scanning direction and read by the sensors respectively.

In this case, the parallelism of the solid-state line image sensors 8-1 and 8-2 can be corrected by using the mark means according to the invention as described hereinabove. However, it is not enough that each of the sensors 8 is merely parallel to the mark and it is essential that the light receiving element arrays of the sensors 8-1 and 8-2 are in alignment with each other. More specifically, even if the light receiving element arrays of the sensors 8-1 and 8-2 overlie the spacing intervals between the line images, it would not be possible to effect adjustments to bring the light receiving element arrays of the sensors 8-1 and 8-2 into alignment with each other unless the particular spacing intervals between the line images in which the light receiving element arrays are disposed are known.

The end can be attained, however, by providing mark means which, when projected on the surfaces of the sensors 8-1 and 8-2 as images of a reduced scale, show variations in the distance between the bar images 16 and 17 in such a manner that the distances between the bar images 16 and 17 vary for different spacing intervals. One example of such mark means will present an image shown in FIG. 12 when projected on the surfaces of the sensors 8-1 and 8-2. As shown, the solid straight line image 10 is divided into two sections, and bar element images 16-1, 16-2, 16-3 and 16-4 are disposed in spacing intervals between the line images in one section of the image 10 while bar element images 17-1, 17-2, 17-3 and 17-4 are disposed in spacing intervals between the line images in the other section of the image 10. The bar section images are disposed such that the distances between the bar element images 16-1 and 17-1, 16-2 and 17-2, 16-3 and 17-3, and 16-4 and 17-4 are distinct from one another. By using the mark means constructed as aforesaid, it is possible to determined not only whether or not the solid-state line image sensors 8-1 and 8-2 are parallel to each other but also in what spacing interval between the line images the light receiving element arrays of the sensors are disposed. Thus it is possible to bring the two sensors 8-1 and 8-2 into alignment with each other.

The embodiment of the mark means described hereinabove by referring to FIG. 12 may be modified. In this modification, the broken straight lines of the mark means are brought into intimate contact with one another in such a manner that when the mark means is projected on the surfaces of the sensors the broken line images are connected to one another and there are no spacing intervals as shown in FIG. 13.

Figure 13:
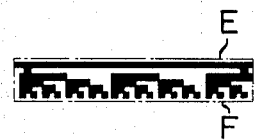
FIG. 13 is a view showing still another embodiment of the mark means in conformity with the invention wherein the broken straight lines of the second mark are connected to one another.

The mark means shown in FIGS. 12 and 13 may also be used when the solid-state line image sensor is one in number.

In all the embodiment shown and described hereinabove, the mark means according to the invention comprises a first mark consisting of a solid straight line corresponding to the straight line mark 9 and shown as the solid straight line image 10 formed on the surfaces of sensors 8-1 and 8-2. It is to be understood, however, that the use of the solid straight line is not essential and that the mark means according to the invention has only to comprise at least two broken straight lines. In the embodiments shown and described above, the dashes or sign elements of each broken straight line of the mark have been described as having a length equal to that of the spacings between the dashes or blank elements. It is to be understood, however, that it is not essential to form the blank elements and the sign elements in the same length. Alternatively, the sign elements may have a length which is twice as great as that of the blank elements or this relation may be reversed. The broken straight lines may be of any shape so long as they can be distinguished from one another when projected as reduced images on the surface or surfaces of the sensor or sensors.

The mark means according to the invention has been described, when projected on the surface of the sensor as an image of a reduced scale, as including lines spaced apart from one another in the auxiliary scanning direction by a distance substantially equal to the width of the light receiving element array and as having a width substantially equal to the width of the light receiving element array. This means that if the initial setting tolerance with regard to the parallelism of the light receiving element array included one-half the width of the light receiving element array as represented by the difference in position on opposite sides of the mark means, the mark means could be produced in such a manner that the lines and the spacing intervals therebetween could be increased to one and a half the width of the light receiving element array of the sensor when the lines are projected as images of a reduced scale on the sensor. Thus the width of the lines and the spacing intervals therebetween may be set at a value which is determined by the tolerance limits for the parallelism of the sensor and the mark means.

Figure 14:
FIG. 14 is a view showing a pair of solid straight lines serving as an indexes for electrically connecting the outputs of the two solid-state line image sensors shown in FIG. 11 correctly in series with each other.

In the line-by-line image dissection system of the split image read-out type, the outputs of the solid-state line image sensors 8-1 and 8-2 should be correctly connected to form a time-sequential signal corresponding to the information contained in the original. To this end, the marm means M placed on the original support table 4 outside the original support zone may consist of two segments M-1 and M-2 as shown in FIG. 11. The spacing interval between the two mark segments M-1 and M-2 are shown in FIG. 14 as line images 10-1 and 10-2 projected on the surfaces of the solid-state line image sensors 8-1 and 8-2 on a reduced scale and spaced apart from each other by a distance corresponding to the length of one light receiving element multiplied by an integer (twice or three times the length of one element). This construction of the mark means M has application in the arrangement whereby two solid-state line image sensors 8-1 and 8-2 used for the line-by-line dissection system read out the original and produce two outputs each having an overlapping portion. The overlapping portion of one output is removed and the two outputs are connected with each other to produce a time-sequential signal. The two outputs of the solid-state line image sensors 8-1 and 8-2 can be correctly connected with each other by taking advantage of the fact that the overlapping portion of the two outputs of the elements 8-1 and 8-2 can be readily removed because the portions of the outputs corresponding to the spacing interval between the line images 10-1 and 10-2 can be readily distinguished from other portions of the outputs.

Figure 15:
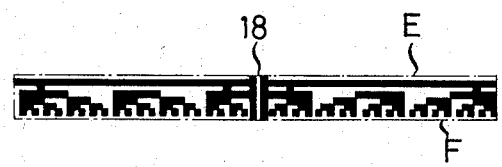
FIG. 15 is a view showing a further embodiment of the mark means in conformity with the invention wherein the pair of straight solid lines shown in FIG. 14 is incorporated.
Figure 16:
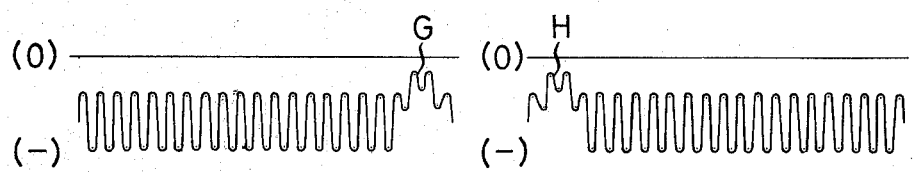
FIGS. 16(a) and 16(b) are views showing the outputs of the two image sensors shown in FIG. 15, produced when the lowermost broken straight line is read out by the two image sensors in such a manner that there is an overlapping portion in the center.

The embodiments of the mark means M consisting of mark segments M-1 and M-2 according to the invention is shown in FIG. 15 in which the mark segments M-1 and M-2 are shown as being projected on the surfaces of the sensors 8-1 and 8-2 on a reduced scale. In FIG. 15, the line images are divided by a spacing interval 18 into two segments irrespective of the arrangements of the solid line and broken line images. The spacing interval 18 is disposed substantially in the center of the line images to extend in the auxiliary scanning direction and has a width corresponding to the length of one light receiving element 11 multiplied by an integer. The spacing interval 18 is defined by a pair of bars extending perpendicular to the line images to form, on opposite sides, line images extending in the auxiliary scanning direction. The width of the spacing interval 18 is set at a value smaller than the length of any blank element of the line images or the spacing between the two bars. When the mark means M shown in FIG. 15 as being projected on the surfaces of the sensors 8-1 and 8-2 on a reduced scale is used, the outputs of the solid-state line image sensors 8-1 and 8-2 will have wave formes designated by (a) and (b) in FIG. 16 in which portions G and H correspond to the spacing interval 18, when the light receiving element arrays are brought into alignments with the broken line image forming the lowermost line of the pattern shown and having the smallest blank elements of all the broken line images. It will be seen that the portions G and H indicate the connection of the two solid-state line image sensors 8-1 and 8-2. Thus the outputs of the sensors 8-1 and 8-2 arranged in chronological sequence can be connected together in series with nice timing, to produce a time-sequential signal.

From the foregoing, it will be appreciated that when the line-by-line image dissection system of the split image readout type uses three or more solid-state line image sensors, the mark means according to the invention can be formed to consist of three or more mark segments to achieve the desired results.

Figure 17:
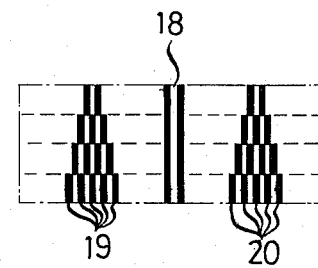
FIG. 17 shows a modification of the embodiment of the mark means in conformity with the invention which includes a plurality of marks shown in FIGS. 8, 9, 12, 13 and 15 arranged in a plurality of stages in one plane, such marks being shown as standard mark patterns and each standard mark pattern having bars of different numbers extending perpendicular to the lines of the mark, to distinguish one standard mark pattern from another.

In the embodiments shown in FIGS. 8, 9, 12, 13 and 15, when the solid-state line image sensors include light receiving elements with wide initial setting tolerance limits and the spacing interval between the dash-and-dot lines E and F is large, the images of the mark projected on the sensors and shown in reduced images as shown in FIGS. 8, 9, 12, 13 and 15 can be formed into a repetitive pattern of images continuous in the auxiliary scanning direction as shown in FIG. 17. When the solid-state line image sensors used are more than two in number, the mark means according to the invention comprises bars shown on a reduced scale as bar images 19 and 20 in FIG. 17 (in which the images of the mark lines on a reduced scale are omitted) each in a position substantially corresponding to the center of one of the solid-state line image sensors arranged in a pattern symmetrical with respect to the spacing interval 18, so that the particular mark with which the solid-state line sensor is aligned can be readily detected. Thus it is possible to readily detect the particular marks with which the solid-state line image sensors are aligned, thereby permitting to effect adjustments of the alignment of the solid-state line image sensors with one another. The bar images 19 and 20 present no obstacles in detecting the degree of inclination of the sensors. When only one solid-state line image sensor is used, the mark means according to the invention need not have a bar as shown in FIG. 17 at 19 and 20 as bar images projected on the sensors on a reduced scale.

From the foregoing description, it will be appreciated that according to the invention the mark means comprising a plurality of mark lines parallel to one another placed on the original support plate in a position outside the original support zone and extending in a direction perpendicular to the auxiliary scanning direction. By performing tests to check the output of the solid-state line image sensor in its initially set condition after the system is assembled, it is possible to judge in which direction the sensor is inclined. Even if the solid-state line image sensor has no parallelism in the initially set condition, the solid-state line image sensor produces an output which indicates in which direction the sensor should be moved to obtain an alignment. Thus the time required for mounting and adjusting a solid-state line image sensor can be greatly reduced by the present invention.

By securely fixing the mark means according to the invention on the original support plate, it is possible for the repair man to readily set the sensor in a correct position even if necessary maintenance work has been done to cope with any trouble that might possibly occur while the system is in operation. Thus the workload of the repair man can be increased and the time required for effecting adjustments can be greatly reduced.

What is claimed is:

1. In a line-by-line image dissection system comprising a solid-state line image sensor having an array of light receiving elements, an original support plate on which an original is placed, irradiating means for irradiating the original on said original support plate, an optical system including a lens for forming on the surface of said solid-state line image sensor through said lens a fragmentary picture image of a reduced scale of said original corresponding to one line of said original, and auxiliary scanning means for moving said fragmentary picture image of said original in a direction perpendicular to the lengthwise direction of said fragmentary picture image relative to the surface of said solid-state line image sensor, mark means located on said original support plate in a position outside an original support zone in a manner to extend in a direction perpendicular to the auxiliary scanning direction to obtain parallelism of said solid-state line image sensor; such mark means comprising:

a first mark consisting of a solid straight line or a broken straight line including a plurality of sign elements and a plurality of blank elements alternatively arranged with one another, said first mark extending in a main scanning direction perpendicular to the auxiliary scanning direction; and a second mark consisting of a broken straight line extending parallel to said first mark, said broken straight line including a plurality of sign elements and a plurality of blank elements alternatively arranged with each other, at least one of the sign elements and the blank elements of said broken line of said second mark differing from the corresponding elements of said first mark in length;

wherein the width of said first mark and said second mark and the spacing interval between said first mark and said second mark are substantially equal to the width of the array of light receiving elements of said solid-state line image sensor when said first mark and said second mark are projected on the surface of said solid-state line image sensor to form mark images of reduced scale.

2. Mark means as claimed in claim 1, wherein said second mark consists of a plurality of broken straight lines extending parallel to one another, at least one of the sign elements and the blank lines of said broken straight lines having a length distinct from one broken straight line to another.

3. Mark means as claimed in claim 2, wherein said mark means further comprises a pair of bars each disposed in the vicinity of either end thereof in the main scanning direction and extending perpendicular to the first mark and the second mark, said bars having a length equal to the width of an initial setting tolerance limits of said array of light receiving elements when the bars are projected on the surface of the sensor to form a bar image of the reduced scale.

4. Mark means as claimed in claim 2, wherein said mark means further comprises a plurality of pairs of bar elements disposed in spacing intervals between the broken straight lines of the second mark and between the first mark and the second mark for distinguishing one line from another, each of said plurality of pairs disposed in each spacing interval in such a manner that the bar elements of the pair are spaced from each other in the main scanning direction by a distance which differs one pair to another.

5. Mark means as claimed in claim 4, wherein said mark means further comprises pair of bar elements disposed, when projected on the surface of the solid-state line image sensor as bar element images of reduced scale, in spacing intervals between one limit of the initial setting tolerance disposed in the auxiliary scanning direction of the light receiving element array of the solid-state line image sensor and the image of the first mark and between the other limit of the initial setting tolerance and the image of the second mark, the bar elements of each of said plurality of pairs being spaced appart from each other by a distance which differs from the distance between the bar elements of any one of pairs of bar elements disposed in the spacing intervals between the images of broken solid lines of the second mark and between the first mark and the second mark.

6. Mark means as claimed in any one of claims 2-5, wherein said plurality of broken straight lines of the second mark have no spacing intervals therebetween so that the broken straight lines of the second mark are connected to one another.

7. Mark means as claimed in any one of claims 2-5, wherein said mark means further comprises a plurality of center bars disposed in the center of the mark means as seen in the main scanning direction to define therebetween a spacing interval extending in the auxiliary scanning direction, said spacing interval having a width smaller than that of any one of blank elements constituting said plurality of broken straight lines of the second mark.

8. Mark means as claimed in claim 7, wherein said plurality of broken straight lines of the second mark are connected to one another with no spacing intervals being interposed therebetween.

* * * * *